United States Patent [19]

Holtgrefe

[11] Patent Number: 4,583,316
[45] Date of Patent: Apr. 22, 1986

[54] ANIMAL TRAP

[76] Inventor: Thomas H. Holtgrefe, 5447 Phillorett Dr., Cincinnati, Ohio 45239

[21] Appl. No.: 533,288

[22] Filed: Sep. 19, 1983

[51] Int. Cl.⁴ ............................................. A01M 23/18
[52] U.S. Cl. ............................................. 43/61; 43/80
[58] Field of Search ........................ 43/61, 62, 74, 80

[56] References Cited

U.S. PATENT DOCUMENTS

| | | | |
|---|---|---|---|
| 666,625 | 1/1901 | Tompkins | 43/74 |
| 1,077,064 | 10/1913 | Hamann | 43/61 |
| 1,216,918 | 2/1917 | Armbauster | 43/61 |
| 1,996,872 | 4/1935 | Long | 43/61 |
| 2,016,049 | 10/1935 | Pritchett | 43/61 |
| 2,573,228 | 10/1951 | Slauth | 43/61 |
| 3,426,470 | 2/1969 | Rudolph | 43/61 |

Primary Examiner—Nicholas P. Godici
Assistant Examiner—M. Jordan
Attorney, Agent, or Firm—Kinney and Schenk

[57] ABSTRACT

An improved live animal trap consisting of an elongated cylinder having at least one open end. Gravity operated doors are disposed at each open end, the doors being movable between an opened and a closed or sealed position. A treadle for actuating a triggering mechanism is disposed approximately in the center of the trap and is operatively connected to a triggering mechanism also completely disposed within the trap. The triggering mechanism is then operatively attached to the doors. When the treadle is activated by an animal entering the trap, the triggering mechanism is displaced, releasing the gravity operated doors which then simultaneously fall into place trapping the animal.

17 Claims, 17 Drawing Figures

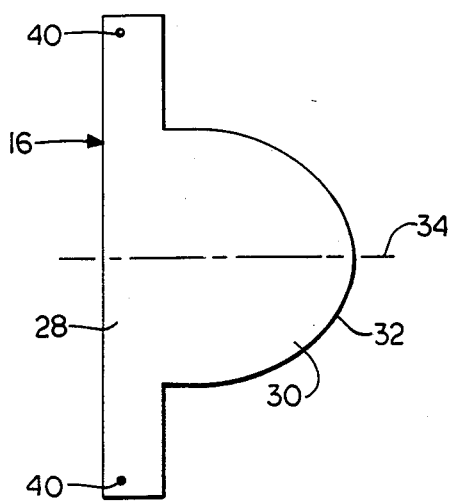
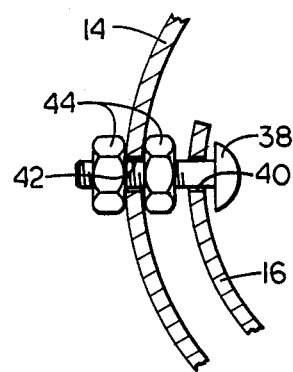
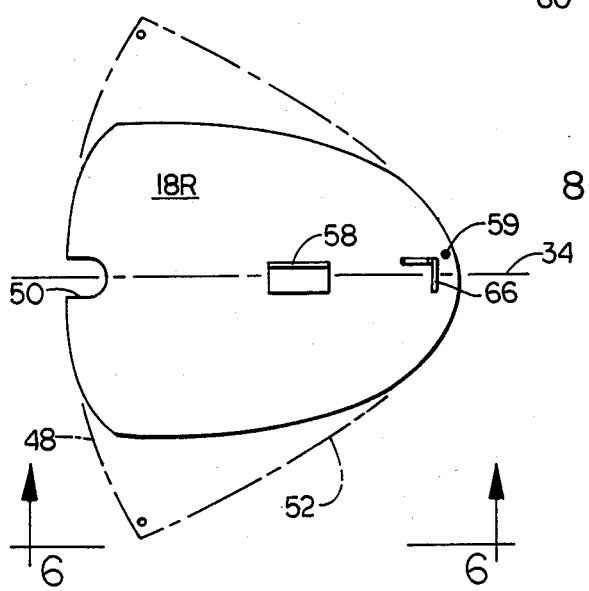
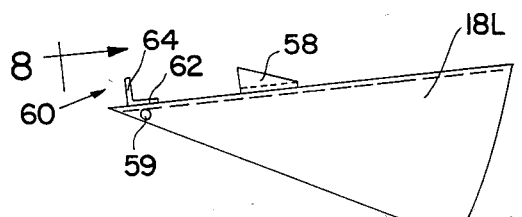
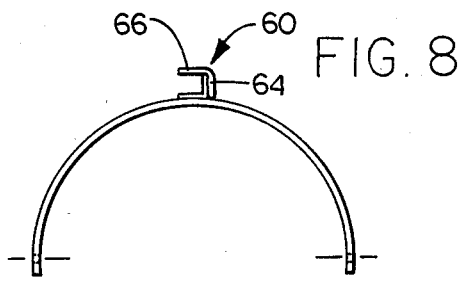
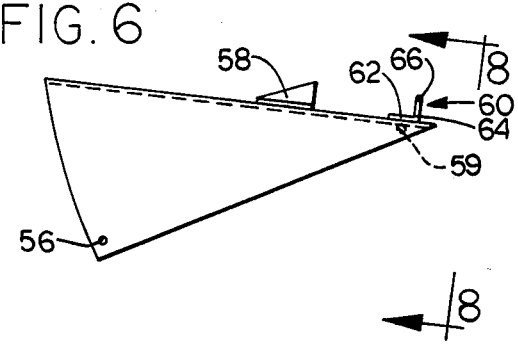
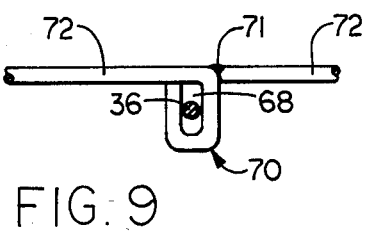

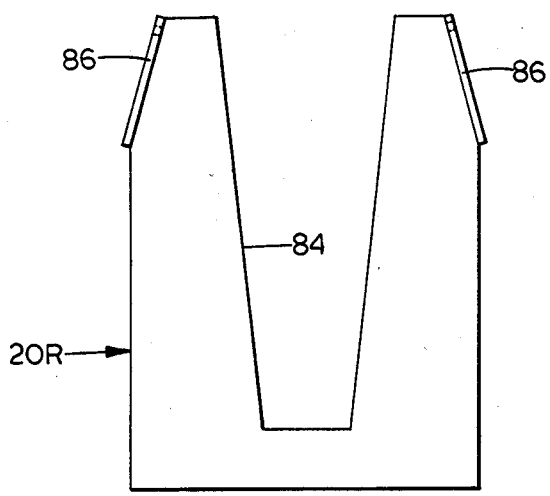
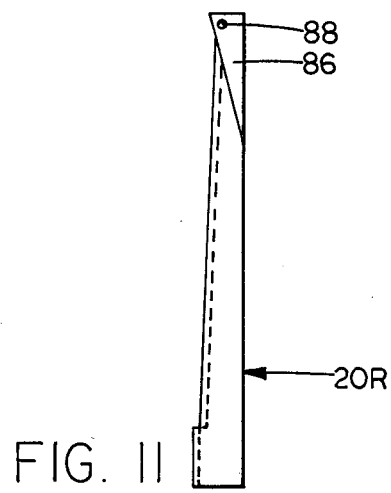
FIG. 10
FIG. 11
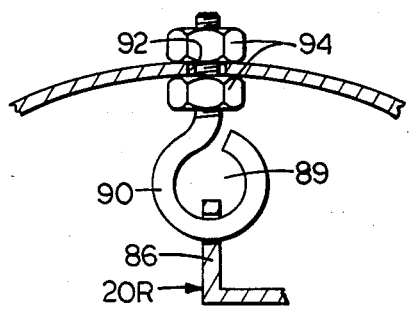
FIG. 12
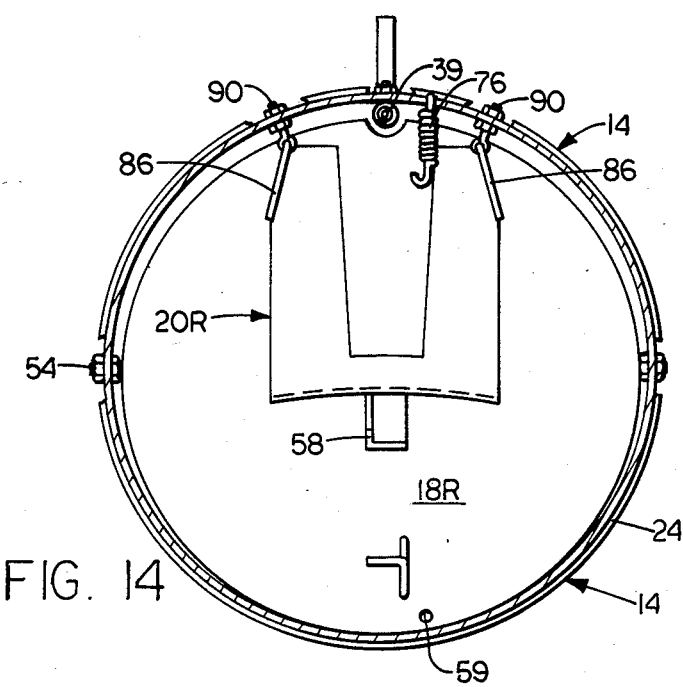
FIG. 14
FIG. 15

ANIMAL TRAP

BACKGROUND OF THE INVENTION

1. Field of the Invention

The present invention relates to animal traps and more particularly to animal traps in which animals are captured unharmed within the trap.

2. Description of the Prior Art

It is well known in the prior art to provide live animal traps having both ends open which are activated by trigger mechanisms. Such live animal traps generally comprise a box-like cage having at least one opening or passage, that opening being selectively sealed or closed by a door through operation of a triggering device placed within or exterior to the trap. Accordingly, an animal loured through the opening of the cage by natural curiosity or bait placed on a device connected to the triggering device will activate the triggering device which closes the doors that seal the opening behind the animal thereby trapping the animal unharmed within the cage.

These prior art live animal trap constructions have certain disadvantages. For example, it is obvious that the cage door must be quickly operative with a snap-action closing upon actuation of the triggering device so as not to allow the animal time to escape. Mechanisms utilized by the prior art devices to achieve this necessary function have usually been extremely complex and prone to failure. Additionally, the triggering device or mechanism utilized must be fail-safe in operation and must be sensitive to movement by the animal. However, the triggering device cannot be overly sensitive for fear that simple jamming of the trap could occasionally effect the closing of the door thus rendering the interior of the trap inaccessible to animals. Prior art traps of this general type normally do not satisfactorily provide a trigger mechanism which operates in accordance with these requisite expectations. Additionally, when a live animal trap having a plurality of openings or doors is utilized, the trigger mechanism of the prior art device construction have been unable to readily and simultaneously control the release of the of doors. Further, due to the complex trigger mechanism construction, it is difficult to set the trigger mechanism of the prior art traps. Still further, the prior art traps are generally made of mesh wire which do not easily blend with the natural surroundings and were difficult to manufacture. This mesh wire construction enables unrestrained animals to view the captured animal causing the captured animal fear and anxiety. Additionally, the doors or closure members of the prior art devices involve complex constructions usually requiring springs for opening folding members etc. Finally, these prior art devices were not reliable under adverse conditions such as being positioned on a slope, in water, or with debris under the door or doors.

While these prior art devices are generally acceptable for trapping various live animals, it is necessary to obviate the disadvantages mentioned above.

The present invention obviates the mesh-like wire construction and replaces it with solid galvanized material. The complex trigger mechanism is obviated by replacing it with a simple gravity operated system located entirely within the trap structure. The difficulty in camouflaging the trap of the mesh-like wire construction and the fear and anxiety of the captured animal when seen by uncaptured animals are obviated by utilizing a solid construction which not only makes it easily concealable in hay piles, saw-dust piles or covered by layers of earth and branches but also prevents uncaptured animals from viewing the captured animal.

The present invention provides an animal trap economically manufactured out of galvanized metal which functions in all weather, has a trigger or linkage mechanism completely contained within the trap for simultaneously closing the trap door at both ends of the trap, has gravity operated simply constructed closure members or doors which function in water, on a slope or with dust or debris under the trap door or doors, has the ability to be readily camouflaged and is economical to manufacture.

SUMMARY OF THE INVENTION

The present invention relates to an animal trap for trapping live animals without causing injury to the animals.

One embodiment of the present invention utilizes a stainless galvanized circular pipe section containing a trigger or linkage mechanism for simultaneously activating closing doors at both ends of the galvanized pipe, a treadle or activating mechanism, gravity operated trap doors which are activated by the trigger mechanism upon the movement of the treadle and locking mechanisms which also fall into place by operation of gravity for locking the doors in closed position.

Accordingly, it is an object of the present invention to provide an animal trap that is both humane and effective in trapping fur-bearing animals alive and without injury either to the animal or to the pelt of the animal and thus will be approved by the humane society.

It is another object of the present invention to provide an animal trap having a straight thru passage, initially open at both ends, which close and seal simultaneously.

It is a further object of the present invention to provide an animal trap having an improved yet simple trigger mechanism.

It is yet a further object of the present invention to provide an animal trap having a trigger mechanism which is activated by a movement of an improved tredal.

It is still yet a further object of the present invention to provide an animal trap having an improved trigger mechanism which when activated by the trigger mechanism closes and simultaneously locks the doors in sealed position.

It is yet another object of the present invention to provide an aniaml trap which gives the captured animal a feeling of security by not allowing other animals to observe or appear to have the captured animal cornered.

It is still a further object of the present invention to provide an animal trap having an improved trigger mechanism activated by a treadle which utilizes an entirely novel construction of the animal trap doors which provide for the sure, reliable and virtually instantaneous operation of the trap door.

It is a further object of the present invention to provide an animal trap having two doors, a trigger mechanism and a treadle easily and reliably set.

It is yet another object of the present invention to provide an animal trap having doors which affectively resists any and all attempts by captured animals to escape.

It is still yet another object of the present invention to provide an animal trap which does not require springs, latches or other complicated mechanisms for effectuating closure of the trap doors.

It is yet a further object of the present invention to provide an animal trap which cannot be accidently exteriorly sprung.

It is a further object of the present invention to provide an animal trap which will not be prematurely sprung by rain, wind or other weather conditions or natural occurences.

It is yet a further object of the present invention to provide an animal trap which is easily camouflaged thereby blending with its natural environment.

It is still a further object of the present invention to provide a single seized animal trap for capturing animals ranging from a barnyard rat to a coyote.

It is still a futher object of the present invention to provide an animal trap which can be modified to capture animals ranging in seize from bear to mice.

It is still yet a further object of the present invention to provide an animal trap which will enable the bait or lour to be effective until an animal enters the trap.

It is a further object of the present invention to provide an animal trap that will become more effective in animals with repeated use.

It is yet a further object of the present invention to provide an animal trap that will not only enclose animals without injury, but, if necessary, will allow the animal to be released unharmed.

It is still a further object of the present invention to provide an animal trap that is cylindrical in shape like the objects that animals treat as natural and approach without fear such as hollow logs, shallow caves, dens, and culvert pipes frequented by many ground animals for feeding, resting, or sanctuary.

It is still yet a further object of the present invention to provide an animal trap in which captured animals will remain peaceful and will not do harm themselves in an effort to gain their freedom.

It is a further object of the present invention to provide an animal trap having a convenient, simple system for bagging the trapped animal without risking injury to either the animal or the trapper.

It is still a further object of the present invention to provide an animal trap that will not harm humans who should accidently come across it in the woods.

It is still yet another object of the present invention to provide an animal trap having proteced internal components which are constructed to prevent the captured animal from damaging the trap.

It is a further object of the present invention to provide an animal trap having means for removing a skunk without the skunk scenting the trap.

It is yet a further object of the present invention to provide an animal trap that operates properly on up to a 20° angle with respect to the horizontal.

It is still yet a further object of the present invention to provide an animal trap that will properly function in up to ½ inch of dust or debris under the doors.

It is a further object of the present invention to provide an animal trap which will function properly in up to 3 inches of water.

Further objectives and advantages of the present invention will become apparent with the following description of the preferred embodiment, the claims and the attached drawings.

BRIEF DESCRIPTION OF THE DRAWINGS

In the following detailed discription of the preferred embodiment, reference is made to the accompany drawing, in which:

FIG. 3 is a plan view of the flat treadle plate before assembly into the animal trap.

FIG. 4 is a fragmentary view in upright section through the treadle plate.

FIG. 5 is a plane view of an end door (right end).

FIG. 6 is a side elevation view taken along line 6—6 in FIG. 5.

FIG. 7 is a side elevation view of the opposite end door (left end) to that shown in FIGS. 5 and 6.

FIG. 8 is an end elevation taken along the line 8—8 in FIG. 7.

FIG. 9 is a fragmentary side elevation illustrating the details of the trigger mechanism construction.

FIG. 10 is a plane view of one door lock.

FIG. 11 is a side view of the door lock of FIG. 10.

FIG. 12. is a fragmentary sectional view of a door lock mounting bolt.

FIG. 14. is an end view illustrating the door in closed position.

FIG. 15 is a fragmentary side sectional view illustrating releasing the door from the locked postions.

DETAILED DESCRIPTION OF THE PREFERRED EMBODIMENT

Figure 1:
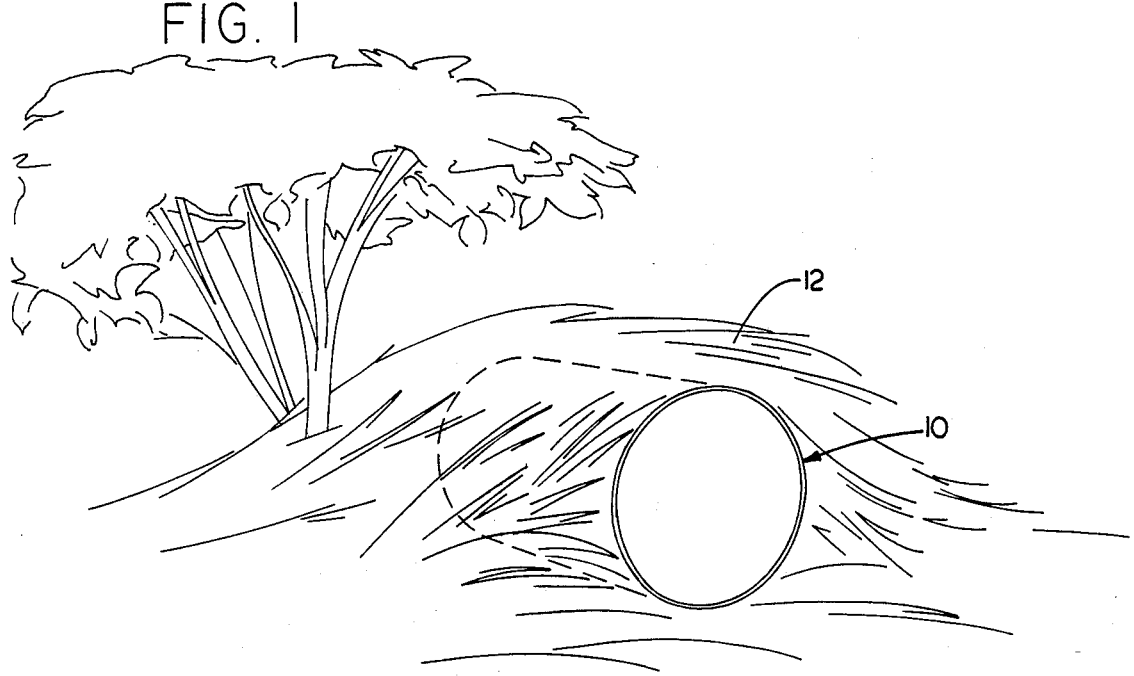
FIG. 1 is a perspective camouflaged environmental view showing an animal trap of the present invention.

The following will be directed to particular elements forming part of or cooperation directly with the present invention. Elements not specifically shown or described herein are understood to be selected from those known in the art.

Referring now to the drawings, one embodiment of the animal trap of the present invention, generally designated 10, is illustrated.

As best illustrated in FIG. 1, animal trap 10, in the form of an elongated cylinder with closeable ends, is shown in its normal work environment. In order to make the trap appear as a natural object to an animal, it is generally set and covered with camouflage 12.

Now as depicted in the drawings, in the following description, the right end of the trap 10 will refer to those elements to the right side of the figure and conversely the left end of the trap will refer to those elements shown to the left side of the figure. The term longitudinal will refer to the long dimension of the trap and lateral or transverse will refer to dimensions perpendicular to longitudinal but remaining in a horizontal plane.

As best illustrated in FIGS. 2, 13A, 13B, and 13C, means are provided for trapping a fur bearing animal without the animal substaining injury within the interior confines of the present invention, animal trap 10. In the embodiment illustrated, this consists of means of confining or casing 14, means for actuating or treadle 16, means for sealing the ends or doors 18R and 18L, means for locking doors in position or door locks 20R and 20L and means for effectuating simultaneously closing of the doors 18R and 18L or trigger mechanism 22.

Means are provided for confining an animal. In the embodiment illustrated, this consists of casing 14. Casing 14 is preferably constructed of light gauge sheet metal that is rolled and rigidly affixed into a cylinderical shape. It should be understood that when constructing a trap for a bear, it is necessary to increase the guage of casing 14 as well as all other components.

Means are provided for strengthening the cylinderical shape of casing 14. In the embodiment illustrated, this consists of stiffing rings 24. Stiffing rings 24 are located adjacent each end of casing 14 and are operatively incorporated therein.

Means are provided for transporting animal trap 10 to and from its work environment. In the emobodiment illustrated, this consists of handle 26. Handle 26, which is preferably, rigidly, operatively affixed to the center of casing 14 approximately midway between the left and right ends of animal trap 10, is preferably constructed of light guage sheet metal.

Means are provided for activating the simultaneous closing of doors 18R and 18L once an animal once inside trap 10. In the embodiment illustrated, this consists of treadle 16. Treadle 16 is constructed from thin gage sheet metal and is operatively connected to trigger mechanism 22. The sensitivity of treadle 16 can be adjusted by positioning a magnet thereon.

As best illustrated in FIG. 3, treadle 16 has an irregular shape with the left hand portion 28 being an elongated rectangle and the right hand portion 30 having curvalinear boundary 32. To prepare treadle 16 for assembly within casing 14, treadle 16 is rolled into a circular arc along longitudinal axis 34 of casing 14 so that treadle 16 operatively fits within the confines of casing 14.

Means are provided for connecting treadle 16 to trigger mechanism 22. In the embodiment illustrated, this consists of ring 36. Ring 36 is rigidly affixed to the inside surface of and along the left hand edge of formed treadle 16.

Means are provided for pivotly attaching treadle 16 within casing 14. In the embodiment illustrated, this consists of bolts 38. Bolts 38 pass outwardly thru clear aperatures 40 located in the upper extremities of treadle 16 and thru clear aperatures 42 (FIG. 4) in the sides of casing 14. Upon insertion thru aperatures 40 and 42, bolts 38 are then operatively attached within aperatures 42 by opposing pair of nuts 44. Thus, enough clearance is provided beteween inner nut of pair of nuts 44 and the head of bolt 38 to permit treadle 16 to freely pivot within casing 14.

Means are provided for sealing the two ends of animal trap 10. In the embodiment illustrated, this consists of right end door 18R and left end door 18L. As best illistrated by the double dot dash line of FIGS. 5 and 6, right end door 18R is constructed of thin gage sheet metal having a compound curvalinear shape. In order to operatively cooperate freely within the confines of casing 14 right hand door 18R is rolled into a circular arc form about longitudinal axis 34. Door 18R has left hand edge 48 shaped to operatively closely cooperate and without interference with the inside diameter of casing 14 when door 18R is in the closed position. Notch 50 is provided in the center of left hand edge 48 of door 18R to provide clearance for trigger assembly 22. Right hand edge 52 of door 18R is also curvalinearly shaped to opertively closely cooperate with the inside surface of casing 14 when door 18R is in the closed position.

Means are provided for mounting door 18R in casing 14. In the embodiment illustrated by FIG. 2 and 14, this consists of bolts 54. Bolts 54 pass through clear aperatures 56 located in the lower corners of formed door 18R. Bolts 54 are fixedly attached within the side wall of casing 14 in the same manner as described for bolts 38 of treadle 16.

Means are provided for cooperating with means for locking doors 18R and 18L in closed position. In the embodiment illustrated, this consists of stop 58. Stop 58 is rigidly affixed to the top central surface of doors 18R and 18L. Stop 58 is a right angle member whose upper flange is triangularly shaped to perform as a non-slip lock for door 18R. It should be noted that the upwardly disposed flange of stop 58 is laterally disposed with respect to the center line of casing 14 to avoid interference with trigger mechanism 22.

Means are provided for doors 18R and 18L to operatively cooperate with trigger mechanism 22. In the embodiment illustrated in FIG. 8, this consists of trip hangars 60. Trip hangar 60 consists of a wire like structure having a longitudinal segment 62, a vertical segment 64 and a traverse segment 66. Longitudinal segment 62 is rigidly affixed to the top left hand surface of and adjacent to the center line of door 18R so that the traverse segment 66 can operatively cooperate with trigger mechanism 22 when door 18R is in the open position.

As illustrated in FIGS. 7 and 8, left end door 18L is identical in construction to right end door 18R. Door 18L is mounted into casing 14 in the same manner as in door 18R except that it is the mirror image of door 18R.

Figure 2:
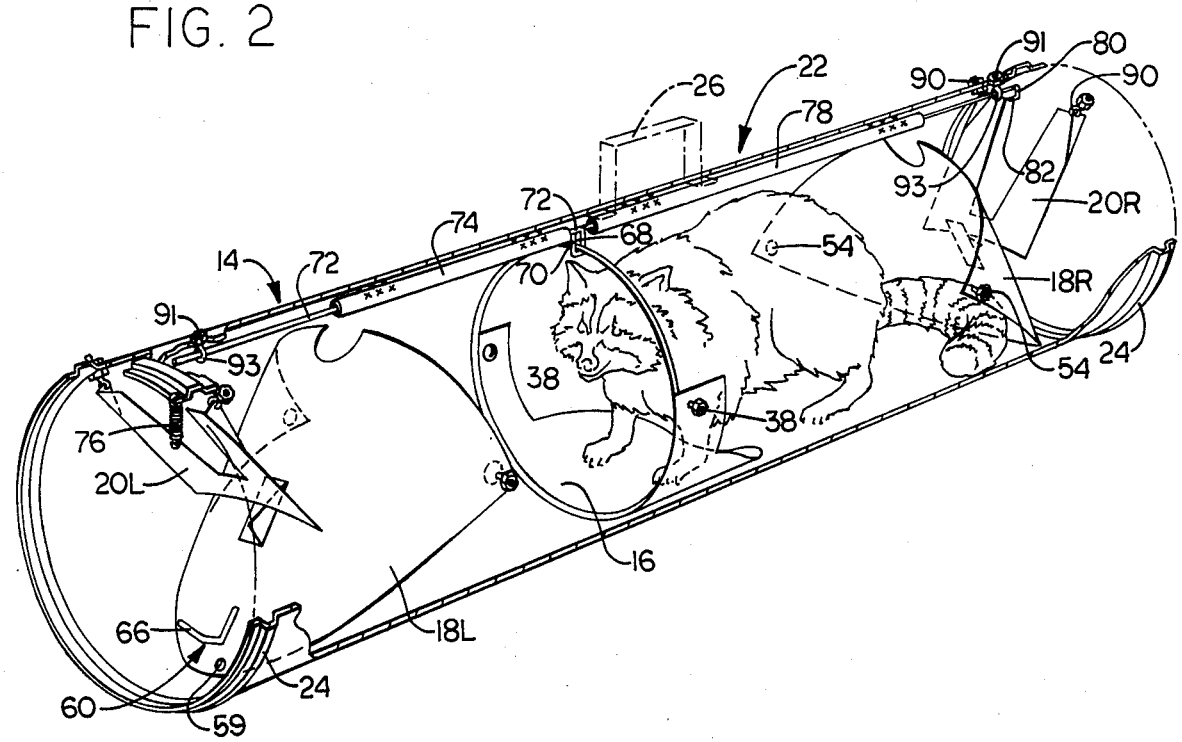
FIG. 2 is a perspective view of the preferred embodiment of the present invention illustrating the cooperative arrangement of internal parts.

Means are provided for effectuating simultaneous closing of doors 18R and 18L upon acuation of treadle 16. In the embodiment illustrated in FIG. 9, this consists of trigger mechanism 22. As previously discussed, treadle 16 incorporates ring 36 which communicates with trigger mechanism 22. More specifically, ring 36 communicates freely with trigger mechanism 22. Trigger mechanism 22 consists of end slot 68 formed by wire loop 70 located at approximately the center of trip wire 72. As best illustrated in FIG. 2, trip wire 72 extends longitudinally from left end of casing 14 thru hangar tube 74, which is in turn rigidly affixed, preferably by welding to the inside top surface of casing 14, to wire loop 70 and then thru hangar tube 77 to the right end of casing 14. Trip wire 72 communicates under but not beyond the traverse segment 66 of trip hangar 60 of left hand door 18L. As best illustrated in FIG. 9, the left and right portions of trip wire 72 form loop 70 in approximately the center of the wire. Loop 70 of trip wire 72 is rigidly affixed by means for rigidly affixing 71 located in the upper right hand corner of wire loop 70 of trip wire 72. As illustrated in FIG. 13C, trip wire 72 continues and extends to right, through hangar tube 78. Hangar tube 78 is in turn rigidly affixed, preferably by welding, to the top inside surface of casing 14. Trip wire 72 extends from the right hand extremity of hangar wire 78 and incorporates vertical segment 80 and reverse segment 82. Reverse segment 82 communicates under the right hand extremity of right end door 18R so that when treadle 16 is caused to move by an animal, ring 36 rotates clockwise thereby moving trip wire 72 slightly to the right thereby simultaneously disengaging both left and right end doors 18R and 18L and instantiously trapping the animal in animal trap 10.

Figure 13A:
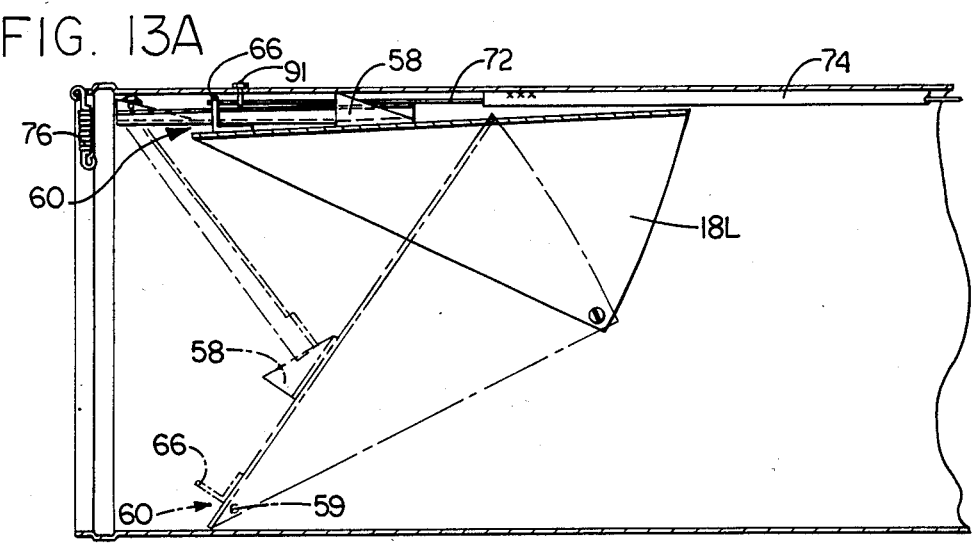
FIG. 13a. is a fragmentary sectional view of the present invention illustrating operative parts in both the open and closed positions of the left third of the trap.
Figure 13B:
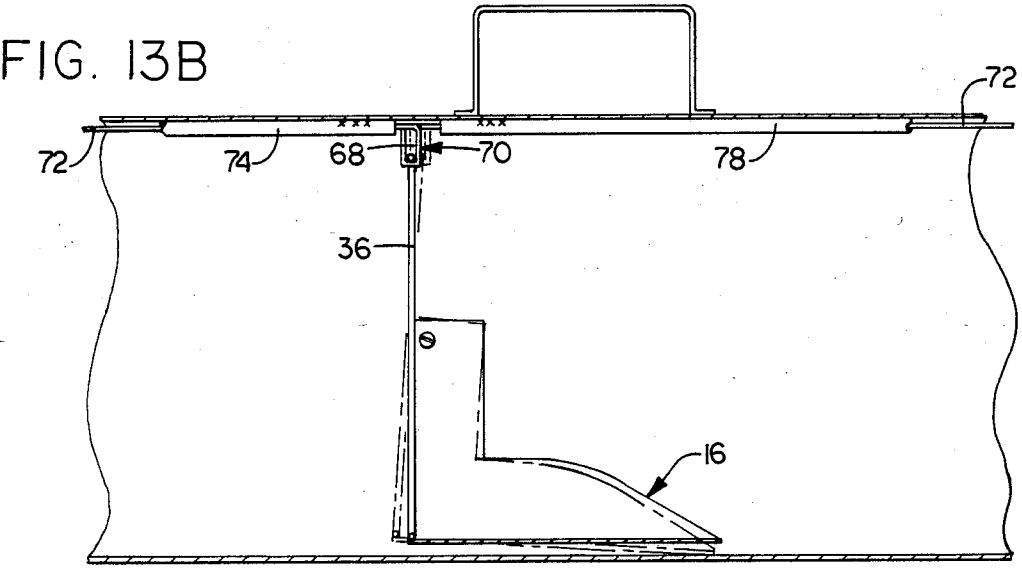
FIG. 13b. is a fragmentary sectional view of the present invention illistrates the details of the treadles and trigger mechanism of the middle third of the trap.
Figure 13C:
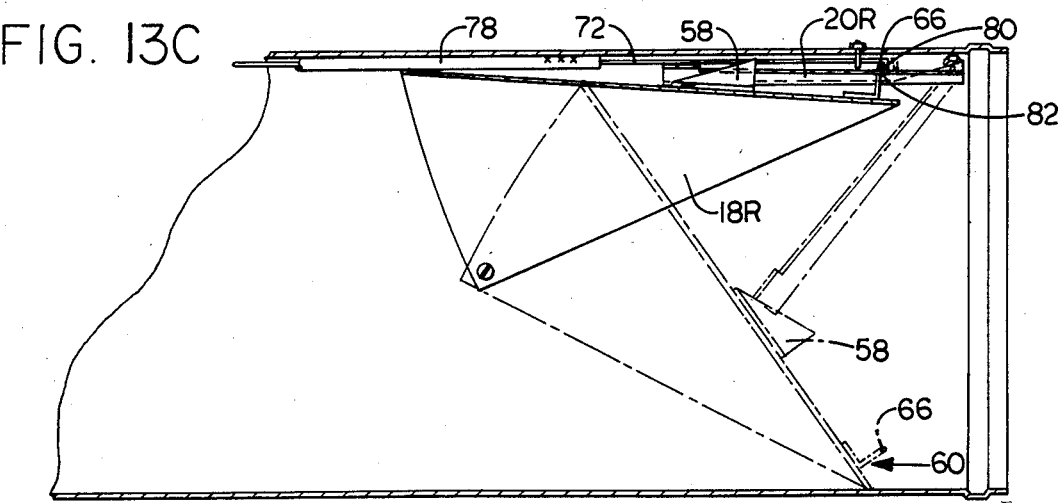
FIG. 13c. is a fragmentary sectional view of the present invention illustrating operative parts in both the opened and closed position of the right third of the trap.

As best illustrated in FIGS. 13A and 13C, upon movement of trip wire 72 to the right, transfer segment 66 of trip housing 60 of left door 18L is disengaged. Simultaneously, reverse segment 80 of trip wire 72 is likewise disengaged from traverse segment 66 of trip hangar 60 of right door 18R.

It should be understood that trip wire 72 could be formed from more than one wire rather than being the single continuous wire illustrated. Applicant has found the continuous wire having a loop formed therein to be the preferred construction.

Means are provided for locking in closed position doors 18R and 18L. In the embodiment illustrated, this consists of door locks 20R and 20L. As illustrated in FIGS. 10 and 11, door lock 20R is formed from thin gage sheet metal. Door locks 20R and 20L incorporate central cutout 84 that provides clearance for the stop 58 and trip hangars 60 of doors 18R and 18L when doors 18R and 18L are positioned in the up or open position.

Means are provided for mounting door locks 20R and 20L in casing 14. In the embodiment ilustrated in FIGS. 2 and 13 this of clear bore 88 in upright tabs 86. Clear bore 88 is provided through each of upright tabs 86 and in turn cooperate with eye 89 of eye bolts 90. As best illustrated in FIGS. 12 and 14, eye bolts 90 pass upwardly thru clear bores 92 located in the upper right hand portion of casing 14. Eye bolts 90 are fixedly attached to casing 14 by pairs of nuts 94.

As best illustrated in FIG. 13A, left end door lock 20L is constructed and mounted in the same manner as the right end door lock 20R except that it is mounted in the mirror image of 20R and central cutout 84L also provides clearance for stop 58 and trip hangar 60 of left end door 18L.

During operation of animal trap 10, as illustrated in FIGS. 1, 2, 13, and 15, animal 96 enters animal trap 10 from either end. Animal 96 is attracted to trap 10 just as if animal trap 10 were a hollow log.

It should be pointed out at this point that animal trap 10 may be used with or without animal bait. In the circumstances described above, animal trap 10 will function properly without the use of bait. On the other hand, in order to entice specific kinds of animals, trappers may have reason to use a specific bait within animal trap 10. If bait is used, bait 98 should be placed upon treadle 16 in close proximity to ring 36.

As best illustrated in FIGS. 13A, B, and C, animal trap 10, with the end doors 18R and 18L held in the up or open position, as illustrated by the solid lines, and in the closed position, as illustrated by the phantom lines, utilizes trip wire 72 to hold open end doors 18L and 18R. Specifically, the left hand extremity of trip wire 72 communicates under trip hangar 60 of the left door 18L, and the right hand extremity of trip wire 72 communicates under reverse segment 82. This construction requires ring 36, which communicates with loop 70, to be positioned in a vertical plane and treadle 16 to be positioned in a horizontal plane.

Once trap 10 has been positioned as describe above, upon entry of animal 96 by walking into trap 10, trap 10 will be operatively activated when animal 96 steps on treadle 16. As best illustrated in FIGS. 13A, B, and C, upon the activation of treadle 16 by animal 96 stepping thereon, treadle 16 is urged to rotate clockwise to the dot dash position. This movement causes ring 36 also to rotate clockwise thereby shifting trip wire 72 to the right. Simultaneously releasing both end doors 18L and 18R. As doors 18L and 18R fall by force of gravity to the closed position, shown in dot-dash lines, door locks 20R and 20L also fall by force of gravity until their unsupported edges wedge against triangular stops 58. The angular relationship between door locks 20R and 20L and the upper edge of stops 58 is close enough to perpendicular that animal 96 cannot dislodge them by any manner of butting, kicking or pulling against them. Animal 96 is now confined within a solid enclosure without injury and, if necessary could be returned to its natural environment.

In order to remove animal 96 from trap 10, the trapper will raise either door lock 20L or 20R by trip hangar 60 with one hand while simultaneously raising door 18L and 18R with the other hand. The trapper utilizes trip hangar 60 as a handle for raising door 18L or 18R. Once the trapper has raised door 18L or 18R, he utilizes a means for retaining door 18L or 18R in the open position, or spring 76. Once one door, 18L or 18R is so retained, the trapper moves to the other end of trap 10 and opens the other door in like manner. The animal, upon seeing the trapper, will normally exit the other end of the trap. After opening the first door but prior to moving to the other end, the trapper positions a bag (not illustrated) around the first opened end of casing 14 which was utilizing stiffling ring 24 as a retainer for the bag's draw string. Upon proper positioning of the bag, as stated above the trapper will then move to the other end and open the other end door. Animal 96, upon seeing the trapper will usually run into the bag.

Occasionally an undesirable animal, such as a skunk, will become entrapped in animal trap 10. When this occurs, there are two suggested methods of removing the undesirable animal.

First, the trapper can tie a cord or string to traverse segment 66 and thread string thru eye bolt 39 located above the respective door 18L or 18R. After the string is properly attached, the trapper will move away from trap 10 and pull the string opening door 18R or 18L thereby allowing the undesirable animal to escape.

Second, if the trapper wants to eliminate the entrapped undesirable animal or skunk, he would transport the entire trap 10 to a body of water and submerge trap 10 completely under water.

The disclosed animal trap will function properly under normally adverse conditions which usually prevents other traps from properly functioning. Specifically, field tests of the present invention indicate that it will properly function when set on a slope up to 20 degrees, with up to approximately ½ inch of dust or debris under either or both doors and/or when set in up to 3 inches of water.

In order to allow the animal to become familiar with the trap, animal trap 10 can be set in the work environment in the off season in the open position. Trap 10 is and prevented from being actuated by an animal by means of a wedge position under treadle 16. Thus, when the trapping season begins, the wedge can be removed allowing the trap to function normally.

Thus, it is apparent that there has been provided in accordance with the present invention, an animal trap that fully satisfies the objects, aims, and advantages set forth above. While the invention has been described in conjunction with the specific embodiment thereof, it is evident that many alternatives, modifications and variations will be apparent to those skilled in the art in light of foregoing description. Accordingly, it is intended to embrace all such alternatives, modifications and variations as fall within the spirit and scope of the appended claims.

What is claimed is:

1. An animal trap, said trap comprising:
   means for confining said animal, said means for confining having at least one open portion;
   at least one means for sealing, said means being located inside said means for containing, said means being located proximate said open portion;
   means for locking said means for sealing, said means being located proximate said means for sealing, said means operatively cooperating with said means for sealing;
   means for stopping, said means being rigidly affixed to said means for sealing, said means being a right angle member having a triangularly shaped upper flange, said triangularly shaped upper flange operatively cooperates with said means for locking said means for sealing whereby said means for stopping cooperates with said means for locking to form a nonslip connection therebetween;
   means for providing clearance for said means for stopping;
   means for simultaneously actuating said means for sealing and said means for locking, said means being located inside said means for containing; and
   means for controlling said means for sealing and said means for locking, said means for controlling being located within said means for confining, said means for controlling being operatively connected to said means for simultaneously actuating.

2. The animal trap as recited in claim 1 wherein said means for sealing further comprises:
   means for mounting said means for sealing said trap inside said means for containing, said means for mounting being an appature, said appature being located proximate the upper outer periphery of said means for sealing.

3. The animal trap as recited in claim 1 wherein said means for locking further comprises:
   at least one cutout portion, said cutout portion being frusto-conical in shape.

4. The animal trap as recited in claim 3 wherein said means for locking further comprises:
   means for mounting said means for locking said means for sealing in said means for containing, said means being tabs, said tabs being located on the outer edges of said means for locking.

5. The animal trap as recited in claim 4 wherein said tabs have at least one appature, said appature operatingly cooperates with said means for containing whereby said means for locking is operatively mounted within said means for containing.

6. The animal trap as recited in claim 1 wherein said means for simultaneously actuating said means for sealing and said means for locking is a treadle, said treadle having an irregular shape, said left hand portion of said treadle being an elongated rectangle and said right hand portion of said treadle having a curvalinear boundary, said treadle being rolled into a circular arc along the longitudinal axis of means for confining said treadle being operatively mounted within said means for confining.

7. The animal trap as recited in claim 6, said treadle further comprising:
   means for mounting said treadle in said means for confining, said means being a bolt and at least one nut.

8. The animal trap as recited in claim 1, said means for controlling said means for sealing in said means for locking said means for confining further comprising:
   a trip wire; and
   means for operatively positioning said trip wire.

9. The animal trap as recited in claim 8, said trap wire further comprising:
   a reverse segment, said reverse segment operatively cooperating with said means for sealing when said means for sealing is held in the open position.

10. The animal trap of claim 1, said means for controlling said means for sealing said means for locking further comprising:
    a trip wire, said trip wire being a single continuous segment, said trip wire having a loop formed therein, said loop being located approximately midway between the extremes of said trip wire, said loop operatively cooperating with said means for simultaneously actuating said means for sealing and said means for locking said means for sealing.

11. The animal trap as recited in claim 1, said trap further comprising:
    means for transporting, said means being operatively attached to said means for confining.

12. The animal trap as recited in claim 11 wherein said means for transporting is a handle.

13. The animal trap as recited in claim 1, said trap further comprising:
    means for opening said means for sealing.

14. The animal trap as recited in claim 3 wherein said means for opening said means for sealing is a metal portion, said portion being operatively attached to said means for sealing.

15. The animal trap as recited in claim 1, said trap further comprising:
    means for retaining said means for sealing in the open position, said means for retaining being located proximate the outer periphery of said means for confining, said means for locking operatively cooperating with said means for sealing whereby said means for sealing is held in the open position by said means for retaining in said open position.

16. The animal trap as recited in claim 15 wherein said means for retaining in said open position is a spring.

17. The animal trap as recited in claim 1 wherein said means for sealing further comprises:
    a trip hangar, said trip hangar being operatively connected to said means for sealing.

* * * * *